United States Patent
Mizuno et al.

(10) Patent No.: US 7,307,116 B2
(45) Date of Patent: Dec. 11, 2007

(54) RUBBER COMPOSITION FOR BREAKER AND PNEUMATIC TIRE USING THE SAME

(75) Inventors: Yoichi Mizuno, Kobe (JP); Masato Kawase, Kobe (JP); Mamoru Uchida, Kobe (JP); Naohiko Kikuchi, Kobe (JP)

(73) Assignee: Sumitomo Rubber Industries, Ltd., Kobe-Shi (JP)

( * ) Notice: Subject to any disclaimer, the term of this patent is extended or adjusted under 35 U.S.C. 154(b) by 72 days.

(21) Appl. No.: 10/151,093

(22) Filed: May 21, 2002

(65) Prior Publication Data
US 2003/0060551 A1    Mar. 27, 2003

(30) Foreign Application Priority Data
May 21, 2001    (JP)    ............................. 2001-151363

(51) Int. Cl.
*C08K 5/04*    (2006.01)
(52) U.S. Cl. ........................................ 524/398; 152/537
(58) Field of Classification Search ................ 524/418, 524/398, 413; 152/537
See application file for complete search history.

(56) References Cited

U.S. PATENT DOCUMENTS 6,211,281 B1    4/2001  Kusano ...................... 524/496
6,533,008 B1 *  3/2003  Lickes et al. ............ 152/209.5
6,814,120 B1 * 11/2004  Nguyen et al. ............. 152/517

FOREIGN PATENT DOCUMENTS

| EP | 0 343 254 A1 | 11/1989 |
|----|--------------|---------|
| EP | 1 074 582 A1 | 2/2001 |
| JP | 01-113233 | 5/1989 |
| JP | 1-168505 A | 7/1989 |
| JP | 7-258476 A | 10/1995 |
| JP | 10-287772 | 10/1998 |

* cited by examiner

*Primary Examiner*—Peter D. Mulcahy
(74) *Attorney, Agent, or Firm*—Birch, Stewart, Kolasch & Birch, LLP

(57) ABSTRACT

To provide a rubber composition for breaker having balanced properties among rigidity, heat resistance, adhesiveness, humid aging adhesion and elongation, and a pneumatic tire having a breaker layer or a belt layer comprising the rubber composition. A rubber composition for breaker comprises 55 to 65 parts by weight of carbon black, 5 to 15 parts by weight of silica, 3.5 to 4.5 parts by weight of sulfur, at least 0.08 part by weight of cobalt, a resorcinol resin and a methylene donor based on 100 parts by weight of a rubber component containing a natural rubber and/or an isoprene rubber as a main component.

17 Claims, No Drawings

RUBBER COMPOSITION FOR BREAKER AND PNEUMATIC TIRE USING THE SAME

BACKGROUND OF THE INVENTION

The present invention relates to a rubber composition for breaker, in particular, a rubber composition for breaker having well-balanced properties among rigidity, heat resistance, adhesiveness, humid aging adhesion and elongation property, and a pneumatic tire having a breaker layer or a belt layer comprising the rubber composition.

In recent years, there is a growing demand for life extension of tires, and it has been tried to improve abrasion resistance of cap tread rubber or to enlarge tread width of a tire. However, this increases heat build-up characteristics of a tire, causing hardening of the breaker rubber or decrease of elongation at break, which results in problems such as burst phenomenon of tire or that separation between a tread and a belt is easily caused.

For improving these situations, it is effective to bring down the heat build-up characteristics of the cap tread, but it then becomes difficult to meet the demand for the abrasion resistance. In addition, there is another general technique of forming a two-layered tread of a cap and a base using a low heat build-up compound for the base tread. However, low heat build-up rubbers usually have poor reinforcing capability, and therefore abrasion resistance decreases when the base tread is exposed at a late stage of abrasion, causing poor abrasion appearance (chipping) or crack at the bottom of the groove. Therefore, the low heat build-up rubber can be used only in such an amount that it is not exposed to the surface in case of wearing, and lowering effect on heat build-up remains small.

Accordingly, there are urgent needs for a rubber compound for breaker durable to such high heat build-up conditions for a tread rubber.

SUMMARY OF THE INVENTION

An object of the present invention is to provide a rubber composition for breaker having well-balanced properties among rigidity, heat resistance, adhesiveness, wet heat adhesiveness and elongation property, and a pneumatic tire having a breaker layer or a belt layer comprising the rubber composition.

In conventional rubber compounding, a large amount of sulfur has been compounded in consideration of adhesion to steel cord and heat build-up characteristics. However, breaker suffers from extremely strong thermal fatigue in addition to mechanical fatigue. Investigations of breaker rubber properties of a tire subjected to actual running prove that elastic modulus is remarkably increased and elongation at break is particularly lowered.

Accordingly, the present invention aims to prevent hardening of breaker rubber after running and lowering of elongation at break by reducing the amount of sulfur affecting mechanical properties to cover the decrease of adhesiveness caused by the above reduction of sulfur by using a resorcinol resin and a methylene donor (a compound capable of supplying a methylene group).

That is, the present invention relates to a rubber composition for breaker comprising 55 to 65 parts by weight of carbon black, 5 to 15 parts by weight of silica, 3.5 to 4.5 parts by weight of sulfur, at least 0.08 part by weight of cobalt, a resorcinol resin and a methylene donor based on 100 parts by weight of a rubber component containing a natural rubber and/or an isoprene rubber as a main component.

It is preferable that the carbon black has an iodine adsorption amount of 70 to 120 g/kg and a dibutyl phthalate (DBP) oil absorption amount of 70 to 125 ml/100 g.

It is preferable that an amount of the resorcinol resin is 0.5 to 3.0 parts by weight and an amount of the methylene donor is 0.5 to 3.0 parts by weight.

The present invention also relates to a pneumatic tire having a breaker layer or a belt layer comprising the rubber composition.

DETAILED DESCRIPTION

The rubber composition for breaker of the present invention comprises a rubber component, carbon black, silica, sulfur, cobalt, a resorcinol resin and a methylene donor. In the present invention, the amount of sulfur which has the worst effect on property change among the rubber compound components is reduced, and the resorcinol resin and the methylene donor cover the expected decrease of adhesiveness and humid aging adhesion caused by the reduction of sulfur. Furthermore, by specifying the optimal compounding amounts of carbon black and silica, a rubber composition having well-balanced properties among rigidity, heat resistance, adhesiveness, humid aging adhesion and elongation property is obtained.

The rubber component to be used is a natural rubber and/or an isoprene rubber from the viewpoint of heat build-up characteristics. Other useful rubber components are a diene rubber such as a styrene-butadiene rubber or a butadiene rubber.

As to the carbon black, one having an iodine adsorption amount of 70 to 120 g/kg is used. When the iodine adsorption amount is less than 70 g/kg, reinforcing ability is low and elongation at break is inferior. When it is more than 120 g/kg, heat build-up characteristic increases. More preferably, the upper limit of the iodine adsorption amount is 115 g/kg, and the lower limit of the iodine adsorption amount is 75 g/kg.

Further, the dibutyl phthalate (DBP) oil absorption amount of the carbon black is preferably 70 to 125 ml/100 g. When the DBP oil absorption amount is less than 70 ml/100 g, rigidity is insufficient. When it is more than 125 ml/100 g, elongation at break is inferior. More preferably, the upper limit of the DBP oil absorption amount is 115 ml/100 g, and the lower limit of the DBP oil absorption amount is 75 ml/100 g.

The amount of carbon black is 55 to 65 parts by weight, based on 100 parts by weight of a rubber component. When the amount of carbon black is less than 55 parts by weight, rigidity is insufficient. When the amount is more than 65 parts by weight, heat build-up characteristic is increased and elongation at break is decreased. More preferably, the upper limit of the amount of carbon black is 63 parts by weight, and the lower limit of the amount of carbon black is 57 parts by weight.

The amount of silica is 5 to 15 parts by weight based on 100 parts by weight of a rubber component. In consideration of the fact that silica is used together with carbon black, lowering effect on heat build-up becomes inferior when the amount of silica is less than 5 parts by weight, while rigidity decreases when the amount is more than 15 parts by weight. More preferably, the upper limit of the amount of silica is 13 parts by weight, and the lower limit of the amount of carbon black is 8 parts by weight.

The amount of sulfur is 3.5 to 4.5 parts by weight based on 100 parts by weight of a rubber component. When the amount is less than 3.5 parts by weight, lowering effect on heat build-up is small and adhesion property is inferior. When the amount is more than 4.5 parts by weight, heat aging resistance is lowered. More preferably, the upper limit of the amount of sulfur is 4.3 parts by weight, and the lower limit of the amount of sulfur is 3.7 parts by weight.

It is preferable to compound cobalt as a cobalt metal salt. Since the cobalt metal salt serves to cross-link the cord with rubber, the compounding of the cobalt metal salt enables to improve adhesion between the cord and rubber. Concrete examples of cobalt metal salts are cobalt stearate, cobalt naphthenate, cobalt neodecanate and the like.

The amount of the cobalt metal salt is at least 0.08 part by weight on the basis of cobalt based on 100 parts by weight of a rubber component. When the amount is less than 0.08 part by weight, adhesion property is inferior. Preferably, the amount of the cobalt metal salt on the basis of cobalt is at most 0.25 part by weight. Even if more than 0.25 part by weight of the cobalt metal salt is compounded, improvement effect on properties does not increase any more, and costs tend to increase. More preferably, the upper limit of the amount is 0.20 part by weight, and the lower limit is 0.10 part by weight.

Examples of methylene donors are hexamethylenetetramin, hexamethoxymethylmelamin and the like.

The resorcinol resin has a hydroxyl group and serves as a methylene receptor. That is, the resorcinol resin causes curing reaction with the methylene group from the methylene donor at its hydroxyl group part, enabling to increase adhesion between the cord and rubber.

Examples of resorcinol resins are a resorcinol-formaldehyde resin, a resorcinol-alkylphenol-formaldehyde resin, a mixture of a resorcinol-formaldehyde resin and a resorcinol-alkylphenol-formaldehyde resin.

It is preferable that amounts of the resorcinol resin and the methylene donor is 0.5 to 3 parts by weight, respectively. When the amount is less than 0.5 part by weight, there is a tendency that a sufficient lowering effect on heat build-up as well as enough rigidity and adhesion property cannot be obtained. When the amount is more than 3.0 parts by weight, hardening tends to become remarkable and elongation at break tends to be inferior. More preferably, the upper limit of amounts of the resorcinol resin and the methylene donor is 2.5 parts by weight, and the lower limit is 1.0 part by weight, respectively.

The ratio of the methylene donor to the resorcinol resin is preferably 2:1 to 1:1, more preferably 1:1 in weight. When the ratio of methylene donor to the resorcinol resin is less than 1, improvement effect on adhesion property tends to be small. When the ratio is more than 2, costs tend to increase.

In addition, it is possible to compound, to the rubber composition of the present invention, fillers such as aluminum hydroxide; softeners such as aromatic process oil and paraffin oil; auxiliary vulcanization activators such as zinc oxide and stearic acid; vulcanization accelerators such as mercaptobenzothiazol (MBT), benzothiazyldisulfide (MBTS) and N-tert-butyl-2-benzothiazylsulfenamide (CBS); and additives such as organic fibers, foaming agents, vulcanization retardants and wax.

The rubber composition for breaker of the present invention is obtained by kneading components except for sulfur and a vulcanization accelerator at first, and then kneading adding sulfur and the vulcanization accelerator.

The thus-obtained rubber composition has well-balanced properties among rigidity, heat resistance, adhesiveness, humid aging adhesion and elongation property. After covering the cord such as steel cord with the rubber composition to form a breaker layer or a belt layer, lamination with other tire materials are carried out and an unvulcanized tire is prepared. Thereafter, vulcanization is carried out to obtain the pneumatic tire of the present invention.

The present invention is explained in detail based on Examples below, but the present invention is not limited thereto.

EXAMPLES 1 to 25 and COMPARATIVE EXAMPLES 1 to 9

(Reagents)
Natural rubber: RSS #3
Carbon black 1: DIABLACK LH (N326) (iodine adsorption amount: 84 g/kg, DBP oil absorption amount: 74 ml/100 g) available from Mitsubishi Chemical Corporation
Carbon black 2: DIABLACK LI (N219) (iodine adsorption amount: 107 g/kg, DBP oil absorption amount: 78 ml/100 g) available from Mitsubishi Chemical Corporation
Carbon black 3: DIABLACK I (N220) (iodine adsorption amount: 118 g/kg, DBP oil absorption amount: 114 ml/100 g) available from Mitsubishi Chemical Corporation
Carbon black 4: SHOBLACK N351 (iodine adsorption amount: 73 g/kg, DBP oil absorption amount: 125 ml/100 g) available from Showa Cabot Co. Ltd.
Carbon black 5: Seast 9 (N110) (iodine adsorption amount: 138 g/kg, DBP oil absorption amount: 115 ml/100 g) available from Tokai Carbon Co., Ltd.
Silica: Ultrasil VN 3 available from Degussa Co.
Silane coupling agent: bis(3-triethoxysilylpropyl)tetrasulfene (Si69) available from Degussa Co.
Resorcinol resin 1: Sumicanol 620 (modified resorcinol-formaldehyde resin) available from Sumitomo Chemical Co., Ltd.
Resorcinol resin 2: RSM (a mixture of 60% by weight of resorcinol and 40% by weight of stearic acid) available from Sumitomo Chemical Co., Ltd.
Methylene donor 1: Sumikanol 507 (methylated methylolmelamine resin) available from Sumitomo Chemical Co., Ltd.
Methylene donor 2: Nocceler H (hexamethylenetetramine) available from Ohuchi Shinko Kagaku Kogyo Co. Ltd.
Cobalt metal salt: cobalt stearate (containing 10% cobalt component) available from Dainippon Ink and Chemicals Inc.
Antioxidant: Ozonone 6C available from Seiko Chemicals Co., Ltd.
Zinc White: Ginrei R available from Toho Zinc Co. Ltd.
Sulfur: sulfur available from Tsurumi Chemicals Co., Ltd.
Vulcanization accelerator: Nocceler DZ (N,N'-dicyclohexyl-2-benzothiazolylsulfenamide) available from Ohuchi Shinko Kagaku Kogyo Co. Ltd.

(Preparation Method of Tire)
The basic compound shown in Table 1 was compounded with each of the compounds shown in Tables 2 to 4 except for sulfur and the vulcanization accelerator. The mixture was kneaded by using a Banbury mixer at about 150° C. for five minutes. To the obtained rubber composition were added sulfur and the vulcanization accelerator, and the composition was kneaded at about 80° C. for five minutes by a twin-screw open roll. Steel cord was covered with the obtained rubber composition and a breaker layer was formed. An unvulcanized tire was prepared using this breaker layer and vulcanization was carried out at 150° C. for 30 minutes under a pressure of 20 kgf to prepare a truck tire having a size of 11R22.5.

(Test Method)

(1) Heat Build-Up Characteristics (Loss Tangent)

(2) Rigidity (Elastic Modulus)

Test pieces were prepared from the breaker rubber composition of the produced new tire. Loss tangent (tan δ) thereof and elastic modulus (complex modulus E*) at 60° C. were measured by using a viscoelastometer made by Iwamoto Corporation under the condition of frequency of 10 Hz and dynamic strain of 1.0%.

For the loss tangent, inverse thereof was indexed to the loss tangent value of Comparative Example 1 as 100. The larger the index, the lower the tan δ is and the lower the heat build-up characteristic is.

Elastic modulus was indexed to the elastic modulus value in Comparative Example as 100. The larger the index is, the higher the rigidity is.

As to the elastic modulus, the same test was carried out after a new tire was mounted on a 10 ton truck and run for 300,000 km.

(3) Elongation at Break

Test pieces were prepared from the breaker rubber composition of the produced new tire and subjected to tensile test using a No. 3 dumbbell in accordance with JIS-K6251 to measure elongation at break $E_B$ (%). $E_B$ was indexed to the $E_B$ value in Comparative Example 1 as 100. The larger the index is, the longer elongation at break and the more excellent burst resistance the composition has.

The same test was carried out after a new tire was mounted on a 10 ton truck and run for 300,000 km.

(4) Adhesion Property

Test pieces were sampled from the breaker rubber composition of the produced new tire and subjected to adhesion test between the second breaker layer and the third breaker layer. Adhesion between steel cord and rubber was evaluated on the basis of the five-point method according to the following criteria.

Point 5: No interface peeling is observed. Only break and separation in rubber is caused.
Point 4: Though very small interface peeling and exposure of steel cord are observed, there is no problem of durability.
Point 3: Interface peeling and exposure of steel cord are partly observed, which is not adequate for a new tire.
Point 2: Interface peeling is large, and there is a problem of durability.
Point 1: Adhesion is impossible at all.

The same test was carried out after a new tire was mounted on a 10 ton truck and run for 300,000 km.

(Test Results)

The results are shown in Tables 2 to 4.

Comparison between Examples 1, 2, 7 and Comparative Examples 3 to 4 in Table 2 proves that it is preferable to compound 55 to 65 parts by weight of carbon black.

Comparison among Examples 2 to 6 in Table 2 proves that the iodine adsorption amount of carbon black is preferably in the range of 70 to 120 g/kg.

Comparison between Example 2 and Comparative Example 2 in Table 2 proves that heat build-up characteristic is lowered, elastic modulus is increased and adhesion property, in particular, adhesion property after running is improved by adding the resorcinol resin and the methylene donor.

Comparison between Example 2 in Table 2 and Examples 10 to 17 in Table 3 proves that amounts of the resorcinol resin and the methylene donor are preferably 0.5 to 3 parts by weight, respectively. When the amount was less than 0.5 part by weight, there is a tendency that lowering effect on heat build-up and adhesion property becomes insufficient. When the amount is more than 3.0 parts by weight, elongation at break tends to decrease.

Comparison between Example 2 in Table 2 and Examples 20 to 21 in Table 4 proves that all of the resorcinol resins and the methylene donors bring about the same excellent improvements.

Comparison between Examples 2, 8, 9 and Comparative Examples 5 to 6 in Table 2 proves that it is preferable to add 5 to 15 parts by weight of silica together with carbon black from the viewpoint of maintaining rigidity.

Comparison between Examples 18 to 19 and Comparative Examples 7 to 8 in Table 4 proves that it is preferable to add 3.5 to 4.5 parts by weight of sulfur. When the amount of sulfur is less than 3.5 parts by weight, heat build-up characteristic is increased and adhesion property is inferior. When the amount is more than 4.5 parts by weight, heat resistance is inferior and elongation at break is particularly decreased.

Comparison among Example 2 in Table 2, Examples 22 to 25 and Comparative Example 9 in Table 4 proves that the amount of cobalt contained as a cobalt metal salt is at least 0.08 part by weight. When the amount is less than 0.08 part by weight, adhesion property is remarkably decreased.

TABLE 1

| Basic compound | Parts by weight |
| --- | --- |
| Natural rubber | 100 |
| Antioxidant | 2 |
| Zinc oxide | 10 |
| Vulcanization Accelerator | 0.8 |

TABLE 2

| | Ex. No. | | | | | | | Com. Ex. No. | | | | Ex. No. | | Com. Ex. No. | |
| --- | --- | --- | --- | --- | --- | --- | --- | --- | --- | --- | --- | --- | --- | --- | --- |
| | 1 | 2 | 3 | 4 | 5 | 6 | 7 | 1 | 2 | 3 | 4 | 8 | 9 | 5 | 6 |
| Compound (part) | | | | | | | | | | | | | | | |
| Carbon black 1 N326 | 55 | 60 | — | — | — | — | 65 | 70 | 60 | 50 | 70 | 65 | 55 | 67.5 | 50 |
| Carbon black 2 N219 | — | — | 60 | — | — | — | — | — | — | — | — | — | — | — | — |
| Carbon black 3 N220 | — | — | — | 60 | — | — | — | — | — | — | — | — | — | — | — |
| Carbon black 4 N351 | — | — | — | — | 60 | — | — | — | — | — | — | — | — | — | — |

TABLE 2-continued

|  | Ex. No. |  |  |  |  |  |  | Com. Ex. No. |  |  |  | Ex. No. |  | Com. Ex. No. |  |
|---|---|---|---|---|---|---|---|---|---|---|---|---|---|---|---|
|  | 1 | 2 | 3 | 4 | 5 | 6 | 7 | 1 | 2 | 3 | 4 | 8 | 9 | 5 | 6 |
| Carbon black 5 N110 | — | — | — | — | — | 60 | — | — | — | — | — | — | — | — | — |
| Silica | 10 | 10 | 10 | 10 | 10 | 10 | 10 | — | 10 | 10 | 10 | 5 | 15 | 2.5 | 20 |
| Silane coupling agent | 1 | 1 | 1 | 1 | 1 | 1 | 1 | — | 1 | 1 | 1 | 0.5 | 1.5 | 0.25 | 2 |
| Resorcinol resin 1 | 1.5 | 1.5 | 1.5 | 1.5 | 1.5 | 1.5 | 1.5 | — | — | 1.5 | 1.5 | 1.5 | 1.5 | 1.5 | 1.5 |
| Resorcinol resin 2 | — | — | — | — | — | — | — | — | — | — | — | — | — | — | — |
| Methylene donor 1 | 2 | 2 | 2 | 2 | 2 | 2 | 2 | — | — | 2 | 2 | 2 | 2 | 2 | 2 |
| Methylene donor 2 | — | — | — | — | — | — | — | — | — | — | — | — | — | — | — |
| Cobalt metal salt | 1 | 1 | 1 | 1 | 1 | 1 | 1 | 1 | 1 | 1 | 1 | 1 | 1 | 1 | 1 |
| Sulfur | 4 | 4 | 4 | 4 | 4 | 4 | 4 | 5 | 4 | 4 | 4 | 4 | 4 | 4 | 4 |
| Properties new tire |  |  |  |  |  |  |  |  |  |  |  |  |  |  |  |
| (1) Heat build-up characteristics | 109 | 107 | 100 | 100 | 107 | 96 | 101 | 100 | 95 | 111 | 94 | 104 | 115 | 100 | 118 |
| (2) Elastic modulus | 100 | 110 | 108 | 115 | 109 | 114 | 115 | 100 | 94 | 95 | 121 | 109 | 102 | 114 | 95 |
| (3) Elongation at break | 110 | 106 | 112 | 101 | 102 | 110 | 102 | 100 | 118 | 114 | 92 | 98 | 101 | 93 | 105 |
| (4) Adhesion | 5 | 5 | 5 | 5 | 5 | 5 | 5 | 4 | 3 | 5 | 5 | 5 | 5 | 5 | 5 |
| after run |  |  |  |  |  |  |  |  |  |  |  |  |  |  |  |
| (2) Elastic modulus | 130 | 143 | 140 | 150 | 142 | 148 | 150 | 145 | 122 | 124 | 157 | 142 | 133 | 148 | 124 |
| (3) Elongation at break | 77 | 74 | 81 | 71 | 71 | 77 | 71 | 55 | 83 | 80 | 64 | 71 | 71 | 65 | 74 |
| (4) Adhesion | 5 | 5 | 5 | 5 | 5 | 5 | 4 | 3 | 2 | 4 | 5 | 5 | 5 | 5 | 5 |

TABLE 3

|  | Ex. No. |  |  |  |  |  |  |  |
|---|---|---|---|---|---|---|---|---|
|  | 10 | 11 | 12 | 13 | 14 | 15 | 16 | 17 |
| Composition (part) |  |  |  |  |  |  |  |  |
| Carbon black 1 N326 | 60 | 60 | 60 | 60 | 60 | 60 | 60 | 60 |
| Carbon black 2 N219 | — | — | — | — | — | — | — | — |
| Carbon black 3 N220 | — | — | — | — | — | — | — | — |
| Carbon black 4 N351 | — | — | — | — | — | — | — | — |
| Carbon black 5 N110 | — | — | — | — | — | — | — | — |
| Silica | 10 | 10 | 10 | 10 | 10 | 10 | 10 | 10 |
| Silane coupling agent | 1 | 1 | 1 | 1 | 1 | 1 | 1 | 1 |
| Resorcinol resin 1 | 0.25 | 1.5 | 3 | 3.5 | 1.5 | 1.5 | 1.5 | 1.5 |
| Resorcinol resin 2 | — | — | — | — | — | — | — | — |
| Methylene donor 1 | 2 | 2 | 2 | 2 | 0.25 | 0.5 | 3 | 3.5 |
| Methylene donor 2 | — | — | — | — | — | — | — | — |
| Cobalt metal salt | 1 | 1 | 1 | 1 | 1 | 1 | 1 | 1 |
| Sulfur | 4 | 4 | 4 | 4 | 4 | 4 | 4 | 4 |
| Properties new tire |  |  |  |  |  |  |  |  |
| (1) Heat build-up characteristics | 98 | 103 | 109 | 111 | 102 | 104 | 108 | 114 |
| (2) Elastic modulus | 100 | 102 | 115 | 125 | 100 | 103 | 112 | 120 |
| (3) Elongation at break | 110 | 108 | 104 | 97 | 110 | 107 | 101 | 98 |
| (4) Adhesion | 4 | 5 | 5 | 5 | 4 | 5 | 5 | 5 |
| after run |  |  |  |  |  |  |  |  |
| (2) Elastic modulus | 130 | 133 | 150 | 163 | 130 | 134 | 146 | 156 |
| (3) Elongation at break | 77 | 76 | 73 | 70 | 77 | 146 | 71 | 70 |
| (4) Adhesion | 4 | 5 | 5 | 4 | 4 | 5 | 5 | 4 |

TABLE 4

|  | Com. Ex. No. |  | Ex. No. |  | Ex. No. |  |  |  |  |  | Com. Ex. No. |
|---|---|---|---|---|---|---|---|---|---|---|---|
|  | 18 | 19 | 7 | 8 | 20 | 21 | 22 | 23 | 24 | 25 | 9 |
| Compound (part) |  |  |  |  |  |  |  |  |  |  |  |
| Carbon black 1 N326 | 60 | 60 | 60 | 60 | 60 | 60 | 60 | 60 | 60 | 60 | 60 |
| Carbon black 2 N219 | — | — | — | — | — | — | — | — | — | — | — |

TABLE 4-continued

|  | Ex. No. | | Com. Ex. No. | | Ex. No. | | | | | | Com. Ex. No. |
| --- | --- | --- | --- | --- | --- | --- | --- | --- | --- | --- | --- |
|  | 18 | 19 | 7 | 8 | 20 | 21 | 22 | 23 | 24 | 25 | 9 |
| Carbon black 3 N220 | — | — | — | — | — | — | — | — | — | — | — |
| Carbon black 4 N351 | — | — | — | — | — | — | — | — | — | — | — |
| Carbon black 5 N110 | — | — | — | — | — | — | — | — | — | — | — |
| Silica | 10 | 10 | 10 | 10 | 10 | 10 | 10 | 10 | 10 | 10 | 10 |
| Silane coupling agent | 1 | 1 | 1 | 1 | 1 | 1 | 1 | 1 | 1 | 1 | 1 |
| Resorcinol resin 1 | 1.5 | 1.5 | 1.5 | 1.5 | — | 1.5 | 1.5 | 1.5 | 1.5 | 1.5 | 1.5 |
| Resorcinol resin 2 | — | — | — | — | 1.5 | — | — | — | — | — | — |
| Methylene donor 1 | 2 | 2 | 2 | 2 | 2 | — | 2 | 2 | 2 | 2 | 2 |
| Methylene donor 2 | — | — | — | — | — | 2 | — | — | — | — | — |
| Cobalt metal salt | 1 | 1 | 1 | 1 | 1 | 1 | 0.8 | 1.5 | 2 | 2.5 | 0.5 |
| Sulfur | 3.5 | 4.5 | 3 | 5 | 4 | 4 | 4 | 4 | 4 | 4 | 4 |
| Properties new tire |  |  |  |  |  |  |  |  |  |  |  |
| (1) Heat build-up characteristics | 100 | 110 | 93 | 118 | 104 | 106 | 109 | 108 | 110 | 111 | 110 |
| (2) Elastic modulus | 105 | 116 | 95 | 122 | 109 | 109 | 111 | 109 | 112 | 111 | 110 |
| (3) Elongation at break | 112 | 103 | 120 | 95 | 104 | 104 | 105 | 107 | 110 | 111 | 105 |
| (4) Adhesion | 4 | 5 | 3 | 5 | 5 | 5 | 5 | 5 | 5 | 5 | 4 |
| after run |  |  |  |  |  |  |  |  |  |  |  |
| (2) Elastic modulus | 131 | 157 | 109 | 142 | 142 | 142 | 144 | 142 | 146 | 144 | 143 |
| (3) Elongation at break | 84 | 70 | 102 | 73 | 73 | 73 | 74 | 75 | 77 | 78 | 74 |
| (4) Adhesion | 4 | 5 | 2 | 5 | 5 | 5 | 4 | 5 | 5 | 4 | 2 |

According to the present invention, by reducing the amount of sulfur having the worst effect on properties among the rubber compound components and by adding a resorcinol resin and a methylene donor to a breaker rubber composition, an improved balance among rigidity, heat resistance, adhesiveness, humid aging adhesion and elongation property is achieved.

What is claimed is:

1. A breaker comprising a rubber composition comprising 55 to 65 parts by weight of carbon black, 5 to 13 parts by weight of silica, 3.5 to 4.5 parts by weight of sulfur, at least 0.08 part by weight of cobalt stearate, a resorcinol resin and a methylene donor based on 100 parts by weight of a rubber component containing a natural rubber and/or an isoprene rubber as a main component.

2. The breaker of claim 1, wherein said carbon black has an iodine adsorption amount of 70 to 120 g/kg and a dibutyl plithalate (DEP) oil absorption amount of 70 to 125 ml/100 g.

3. The breaker of claim 1, wherein an amount of the resorcinol resin is 0.5 to 3.0 parts by weight and an amount of the methylene donor is 0.5 to 3.0 parts by weight.

4. The breaker of claim 2, wherein an amount of the resorcinol resin is 0.5 to 3.0 parts by weight and an amount of the methylene donor is 0.5 to 3.0 parts by weight.

5. A pneumatic tire having the breaker of claim 1.

6. The breaker of claim 1, wherein said carbon black has an iodine adsorption amount of 75 to 115 g/kg and a dibutyl phthalate (DBP) oil absorption amount of 75 to 115 ml/100 g.

7. The breaker of claim 1, wherein the carbon black is present in an amount of 57 to 63 parts by weight.

8. The breaker of claim 1, wherein the silica is present in an amount of 8 to 13 parts by weight.

9. The breaker of claim 1, wherein the sulfur is present in an amount of 3.7 to 4.3 parts by weight.

10. The breaker of claim 1, wherein the cobalt is present in an amount of 0.10 to 0.20 parts by weight.

11. The breaker of claim 1, wherein said carbon black has an iodine adsorption amount of 75 to 115 g/kg and a dibutyl phthalate (DBP) oil absorption amount of 75 to 115 ml/100 g;

wherein the carbon black in present in an amount of 57 to 63 parts by weight;

wherein the silica is present in an amount of 8 to 13 parts by weight;

wherein the sulfur is present in an amount of 3.7 to 4.3 parts by weight; and wherein the cobalt is present in an amount of 0.10 to 0.20 parts by weight.

12. The breaker of claim 11, wherein an amount of the resorcinol resin is 0.5 to 3.0 parts by weight and an amount of the methylene donor is 0.5 to 3.0 parts by weight.

13. A pneumatic tire having a breaker of claim 12.

14. The breaker of claim 1, wherein the proportion of methylene donor to resorcinol resin ranges from 2:1 to 1:1.

15. A pneumatic fire having a breaker of claim 14.

16. The breaker of claim 11, wherein the proportion of methylene donor to resorcinol resin ranges from 2:1 to 1:1.

17. A pneumatic tire having a breaker of claim 16.

* * * * *